Patented Jan. 16, 1951

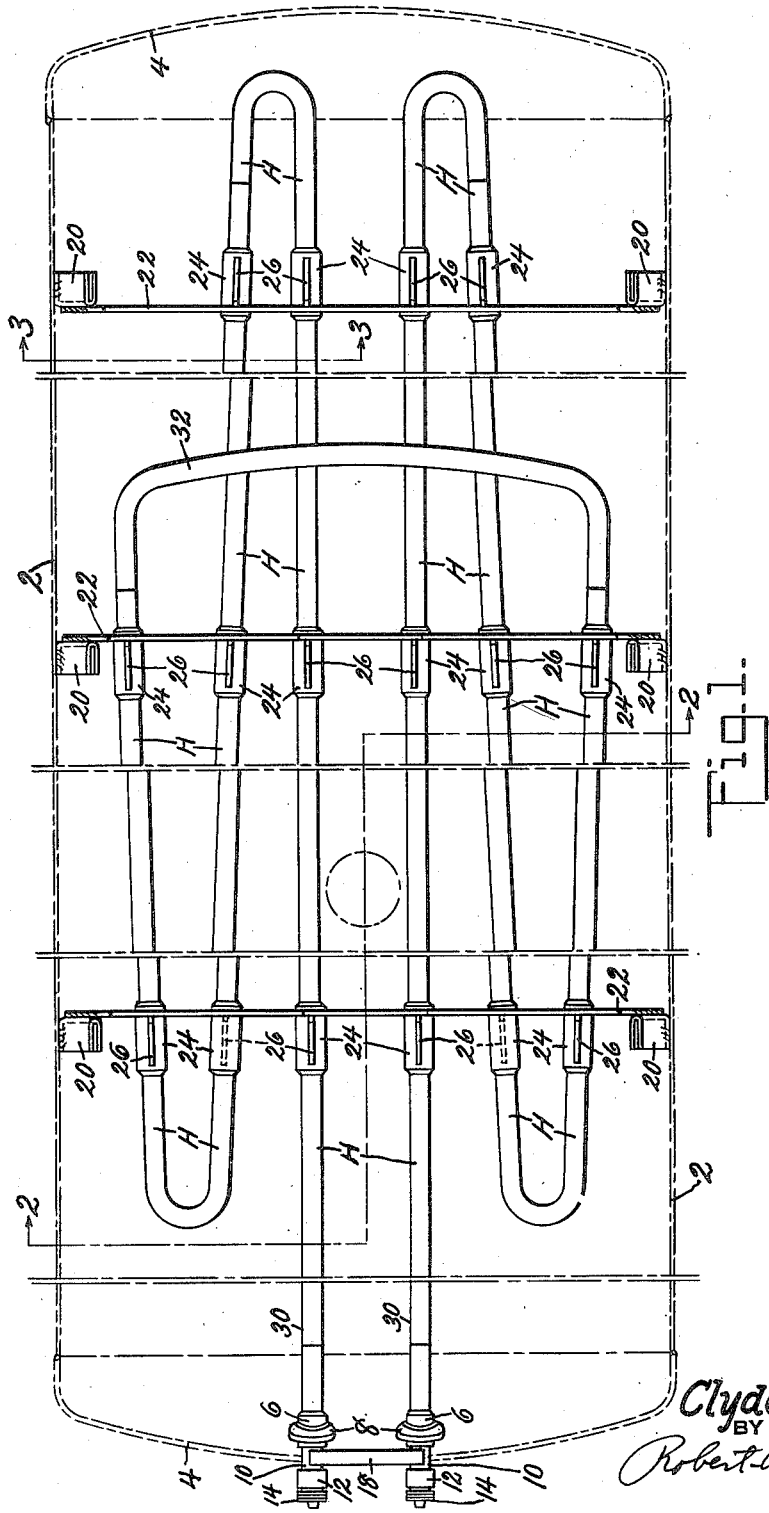

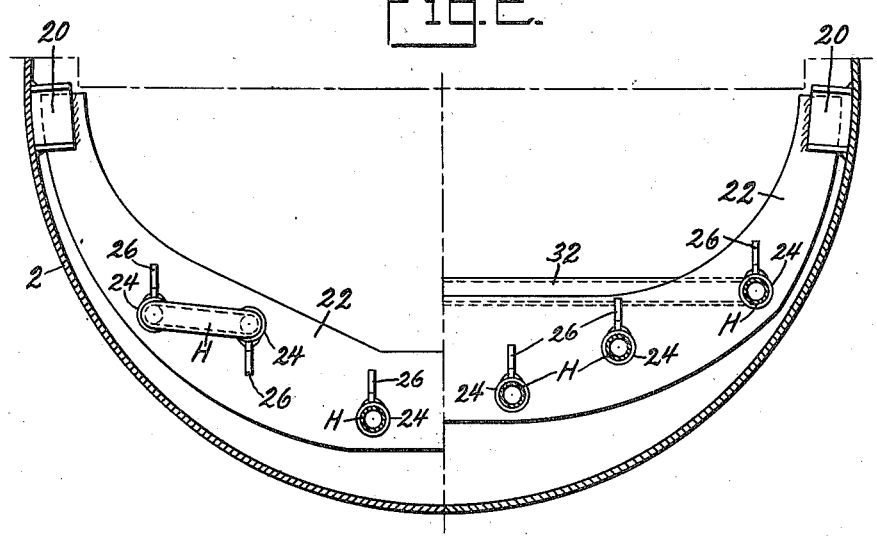
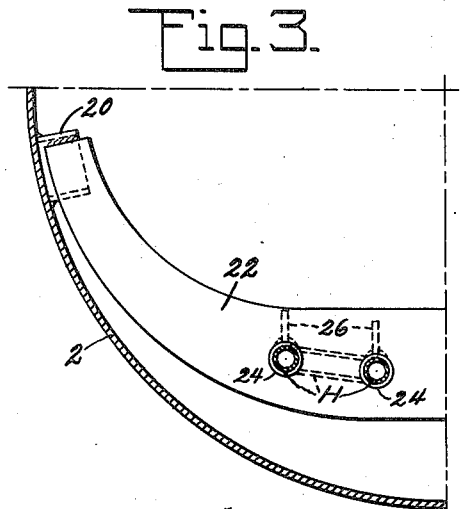
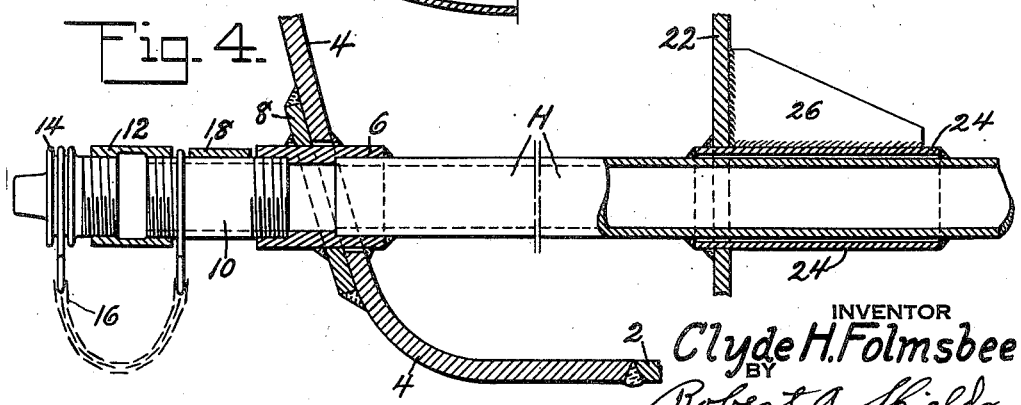

2,538,305

UNITED STATES PATENT OFFICE 2,538,305

SUPPORT FOR TANK HEATING DEVICES

Clyde H. Folmsbee, Bloomsburg, Pa., assignor to American Car and Foundry Company, New York, N. Y., a corporation of New Jersey Application December 29, 1945, Serial No. 638,324

7 Claims. (Cl. 248—68)

This invention relates to heaters in general and in particular to heating coil arrangements and support in tanks of either mobile or stationary type.

In the application of heating pipes or coils to mobile tanks, such as railway tank cars, it is necessary to properly support and anchor the pipes to withstand vibration during travel. This has been accomplished in the past by the use of anchoring clips supporting the pipes at various points in the tank, with the pipes sliding in the anchoring clips. Such an arrangement is fairly satisfactory for iron or steel construction but becomes utterly worthless in case of non-ferrous metal tanks and pipes due to rapid abrasion at the points of sliding support with consequent contamination requiring destruction of the lading. It is an object, therefore, to provide a tank heating-device wherein the pipes are all fixed on their support.

Another object of the invention is the provision of supporting means for heating pipes so arranged that the pipes are cradled by and swing with the supports during expansion.

A further object of the invention is the provision of substantially catenary form supports anchored at their ends to the tank shell and supporting the heating pipes for swinging movement during expansion.

A yet further object of the invention is the provision of a support for non-ferrous heating pipes so arranged as to eliminate abrasion of the heating pipe or support.

These and other objects of the invention will be apparent to persons skilled in the art from a study of the following description and accompanying drawings, in which Fig. 1 is a plan view of the improved heating arrangement;

Fig. 2 is a sectional view taken substantially on line 2—2 of Fig. 1;

Fig. 3 is a sectional view taken substantially on line 3—3 of Fig. 1, and

Fig. 4 is a longitudinal sectional view disclosing details of the anchorage between the heating pipes and the tank shell.

Referring now to the drawings in detail it will be seen that the tank is formed of a cylindrical shell 2, to the ends of which are welded suitably shaped tank heads 4. Entry to the tank for the heating pipes is preferably made by means of ferrules 6, welded or otherwise attached to the tank head and to a reinforcing plate 8, as most clearly shown in Fig. 4. In order that external connection may be made the ferrules are threaded to receive short pipe sections 10, coupling 12 and plug 14. The plugs 14 have attached thereto chains 16 anchored on the short pipes 10 so that they will not be lost during periods when the tank is being heated. As clearly shown, the short sections 10 of pipe are braced by means of tie strap 18 which will also prevent any turning of the pipe sections 10 and relieve the ferrules 6 of strain incident to insertion or removal of plugs 14.

As clearly shown in Figs. 1, 2 and 3, brackets 20 are welded or otherwise attached to the interior of the tank shell adjacent the horizontal medial plane of the tank. Any number of these brackets may be used distributed throughout the length of the tank, but in the present instance three on each side were found to be sufficient. Each pair of diametrically opposite brackets 20 have welded thereto a flat plate 22 of general catenary form and each of these plates is provided with a plurality of holes for the reception of tube sections 24. The tube sections 24 are welded directly to the catenary form suspension plates 22, as well as indirectly by means of gussets 26, thus it will be seen that the short tube sections 24 and gussets 26 will stabilize the catenary form suspension plates against twisting or distortion incident to expansion of the heater pipes.

As most clearly shown in Fig. 1, the heater pipes H are arranged in what might be considered opposed N form, with the adjacent ends 30 anchored by means of welding or otherwise to the ferrules 6 and with the opposite or opposed ends connected by means of a U shaped pipe 32. The heater pipes are arranged so as to pass through the short pipe sections 24 to which they are welded, thus the pipes can not move relative to the catenary form suspension, but in case a weld should break, either between the heater pipe and tube 24 or between the tube 24 and the catenary form suspension plates, serious abrasion of the pipes could not occur due to the extended bearing area until at least repairs could be made. It will be apparent from Figs. 1, 2 and 3 that the heater pipes are so arranged as to give complete drainage of any condensate that might form in the pipes. Since the heater pipes are anchored at their ends 30 to the tank shell all expansion movement will originate from this point. In other words, assuming that the pipe would expand one inch in the space between braces, then considering the braces or supports 22 from left to right of Fig. 1, the first brace would have to move one inch, the second brace two inches and the third brace three inches. Any expansion of the free loops in the heater pipes will, of course, in no way affect the suspension braces and expansion of the two outer pipe sections between the middle and left hand brace of Fig. 1, or the outer pipe sections between the middle and right hand brace of Fig. 1 will affect but slightly the movement of the suspension plates, since all pipe sections between the plates will expand at substantially the same rate. Thus it will be seen that in effect the entire heater pipe arrangement is cradled for swinging movement by the catenary form suspension members 22. Due to the relatively great distance between the outermost heater pipe and the anchor brackets 20, no great strain can be imparted to the suspension members 22. It should also be noted that any expansion of the tank shell tending to increase the tank diameter will affect but slightly the catenary supports 22.

While reference has been made to the fact that the above described arrangement is ideal for non-ferrous tanks and heater pipes, it will be obvious that it is also ideal for ferrous tanks and heater pipes, since there are no sliding connections and no points at which abrasion can appear, nor can there be any vibratory motion between parts during travel of the tank car over the rails. It will also be obvious that slight modifications may be made in the form and attachment of the parts, but all such modifications are contemplated as fall within the scope of the following claims defining my invention:

What is claimed is:

1. A pipe supporting structure for use in a tank comprising, pipes subject to expansion and contraction under conditions of use disposed in said tank, a support for said pipes comprising a vertically disposed horizontally flexible catenary form member anchored at its ends to the tank adjacent the horizontal medial plane of the tank, and means immovably securing said pipes to said catenary form support member intermediate its ends, whereby expansion of the pipes will cause flexing of said catenary form member.

2. A pipe supporting structure for use in a tank comprising, pipes subject to expansion and contraction under conditions of use disposed in said tank, a support for said pipes comprising a vertically disposed horizontally flexible catenary form member anchored solely at its end portions to the tank adjacent the horizontal medial plane of the tank, stub tubes fastened to said support and adapted to receive said pipes, and means securing said pipes rigidly within said stub tubes thereby preventing relative movement between said pipes and support while permitting relative movement between said pipes and tank.

3. A pipe supporting structure for use in a tank, a plurality of catenary form members suspended at their ends to the tank interior adjacent the horizontal medial plane through the tank and formed with openings remote from their ends, said suspension members being flexible in a direction parallel to the axes of said openings, pipes subject to expansion and contraction under conditions of use disposed within the tank and extending through said openings, and means anchoring said pipes to said catenary form suspension member, said means including stub tubes welded at spaced points to said suspension members and to said pipes.

4. A pipe supporting structure for use in a tank, a plurality of catenary form support members suspended at their ends to the tank interior adjacent the horizontal medial plane through the tank and formed with openings remote from their ends, said support members being freely flexible between their ends in a direction parallel to the axes of said openings, pipes subject to expansion and contraction under conditions of use disposed within the tank and extending through said openings, and means anchoring said pipes to said catenary form support member, said means including, stub tubes extending into said openings and welded to said support members and pipes, and stabilizing gussets welded to said stub tubes and support members to resist buckling of the support members during flexing.

5. An article of manufacture comprising, a flat plate shaped to substantially catenary form and provided with a plurality of openings remote from its ends, stub tubes fastened to said plate in alignment with the openings in the plate and adapted to receive pipes, which pipes may be subject to expansion and contraction under conditions of use, said flat plate being free to flex between its ends in a direction parallel to the axes of said stub tubes.

6. An article of manufacture comprising, a flat plate shaped to substantially catenary form and provided with a plurality of openings remote from its ends, stub tubes welded to said plate substantially in alignment with the openings in the plate, said flat plate being free to flex between its ends in a direction parallel to the axes of said stub tubes and gusset plates welded to said stub tubes and plate to stabilize the latter during flexing of the flat plate.

7. A pipe supporting structure for use in a tank, a plurality of flexible catenary form support members anchored at their ends to the tank interior adjacent the horizontal medial plane through the tank for relative flexible movement with respect thereto, and formed with openings remote from their ends, pipes subject to expansion and contraction under conditions of use arranged in opposed N form within the tank and extending through the openings in said catenary form support members, means fastening said heating pipes to said support members and spacing the same therefrom, pipe means joining the remote ends of said pipes, and means anchoring the adjacent ends of said pipes to said tank, said last named means including ferrules welded to said tank and extending therethrough to give access to the interior of the heating pipes.

CLYDE H. FOLMSBEE.

REFERENCES CITED

The following references are of record in the file of this patent:

UNITED STATES PATENTS

| Number | Name | Date |
|---|---|---|
| 1,412,756 | Smith | Apr. 11, 1922 |
| 1,500,895 | Rover | July 8, 1924 |
| 1,649,542 | Parks | Nov. 15, 1927 |
| 1,706,084 | Steinmeyer et al. | Mar. 19, 1929 |
| 2,402,209 | Ryder | June 18, 1946 |

FOREIGN PATENTS

| Number | Country | Date |
|---|---|---|
| 307,956 | Great Britain | Mar. 7, 1929 |